P. T. HEARTT & T. SALFNER.
PLAYING CARDS.
APPLICATION FILED OCT. 18, 1917.

1,264,508.

Patented Apr. 30, 1918.
2 SHEETS—SHEET 1.

WITNESS:
Howard P. King.

INVENTORS
Philip T. Heartt
Theodor Salfner
BY
ATTORNEY

P. T. HEARTT & T. SALFNER.
PLAYING CARDS.
APPLICATION FILED OCT. 18, 1917.
1,264,508.
Patented Apr. 30, 1918.
2 SHEETS—SHEET 2.
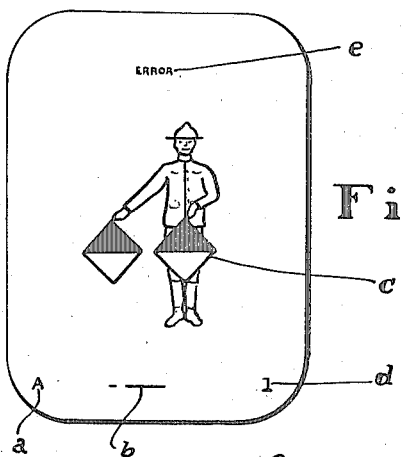
Fig. 6.
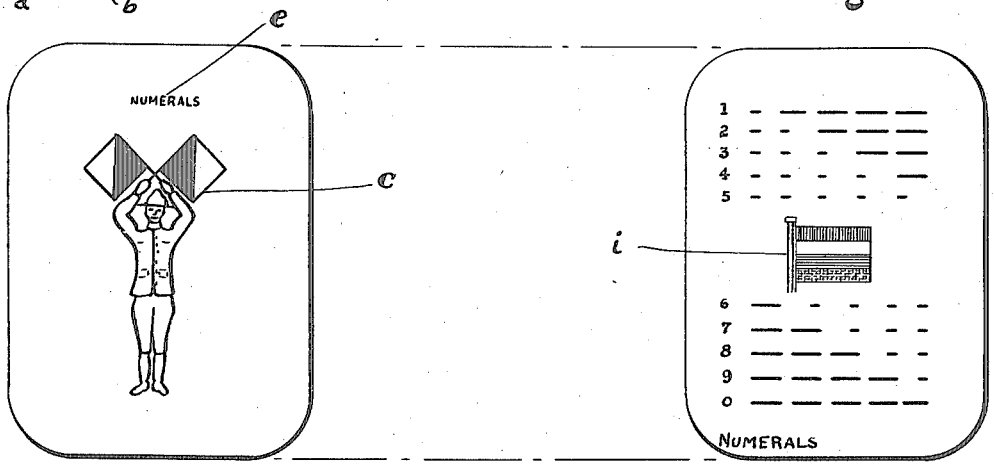
Fig. 8.
Fig. 7.
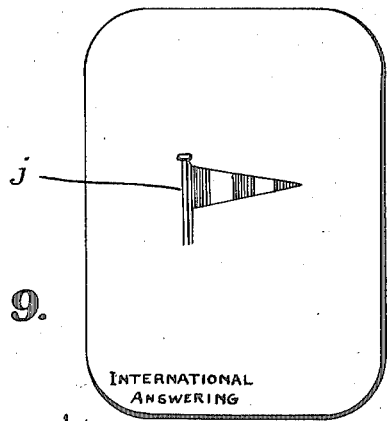
Fig. 9.
WITNESS:
Howard P. King.
INVENTORS
Philip T. Heartt
Theodor Salfner
BY
Rockwell Rockwell
ATTORNEY

UNITED STATES PATENT OFFICE.

PHILIP T. HEARTT AND THEODOR SALFNER, OF MONTCLAIR, NEW JERSEY.

PLAYING-CARDS.

1,264,508.  Specification of Letters Patent.  Patented Apr. 30, 1918.

Application filed October 18, 1917. Serial No. 197,182.

*To all whom it may concern:*

Be it known that we, PHILIP T. HEARTT and THEODOR SALFNER, citizens of the United States, and residents of Montclair, in the county of Essex and State of New Jersey, have invented new and useful Improvements in Playing-Cards, of which the following is a specification.

The objects of this invention are to facilitate learning the different symbols used in military signaling, not only by the semaphore code used by the United States but also by the international flags and the international Morse code; to provide pictorial representations of these various symbols conveniently arranged and assembled on cards, the different meanings of any symbol which has more than one meaning being shown on the same card and the symbols of the United States and international codes for the same letter being shown on opposite sides of the same card; to enable a soldier or the like to have this information in the best and most compact form; to enable the symbols to be utilized in a game which will easily and pleasantly fix them in the memory; to enable one to utilize his knowledge of the symbols by showing them upon the backs of the cards in a different form from that in which they appear on the faces of the cards; to secure an interesting and educational game, and to obtain other advantages and results as may be brought out in the following description.

Referring to the accompanying drawings, in which like numerals of reference indicate the same parts throughout the several views, Figure 1 is the face of a card showing a letter and its representation both by dots and dashes and by semaphores;

Figure 1:
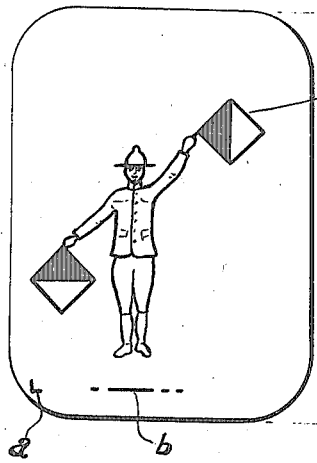
Figure 3:
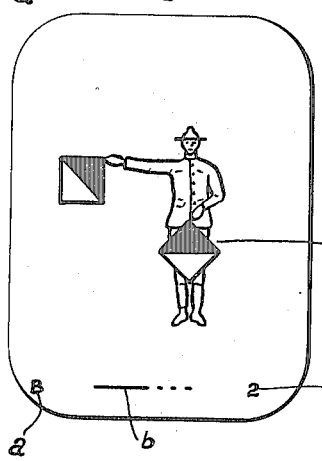
Fig. 3 shows the face of a card corresponding to the face shown in Fig. 1 but bearing symbols which as used by the United States designate a numeral as well as a letter.

Fig. 6 similarly shows the face of a card bearing symbols which as used by the United States mean not only a letter and a numeral but also have another meaning;

Fig. 7 shows the face of a card corresponding to the faces shown in Figs. 1 and 3 and bearing a symbol which as used by the United States indicates what is to follow;

Fig. 8 shows the back of the card shown in Fig. 7 with the flag of the international code which means "numerals," and also the international Morse cord for all the digits, and Fig. 9 shows the back of a card bearing a symbol which by the international code has another meaning than a letter or numeral.

Figure 5:
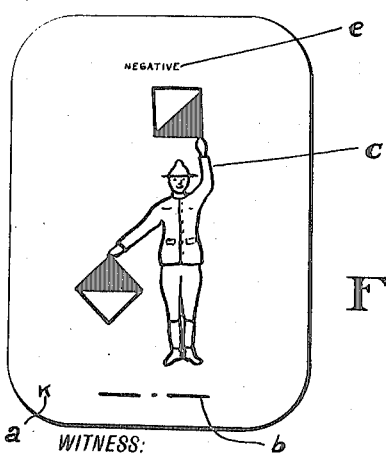
Fig. 5 shows the face of a card bearing symbols which as used by the United States sometimes have another meaning than the simple letter.

In carrying out our invention, we employ twenty-nine cards, twenty-six of which bear each upon its face a letter of the alphabet, the dot and dash symbol for this letter according to the international Morse code and the corresponding symbol of the semaphore code used by the United States. Preferably these are arranged as shown in the drawings, with the letter in the lower left-hand corner, designated by reference character $a$, the dot and dash symbol at the bottom of the card, designated by reference character $b$, and the semaphore illustration in the center of the card, designated by reference character $c$, but obviously any other arrangement could be used if desired. In addition to the above symbols it is necessary for ten of the cards to bear digits indicating that the symbols thereon are used for those digits as well as for the letters. We have shown these digits placed each in the lower right-hand corner of its card, see Figs. 3 and 6, and indicated by reference character $d$, although they could obviously be otherwise arranged if desired. Furthermore, seven of the symbols on the cards sometimes indicate something other than a mere letter, as shown in Fig. 5 where the symbol for the letter is shown as also indicating "negative", or as shown in Fig. 6 where the symbol for letter A and also digit 1 is shown as indicating "error". We have shown this additional meaning written at the top of the card, as indicated by reference character $e$, but obviously it could be otherwise placed if desired. There are other letter symbols, for O, P and R, and also a letter and figure symbol for C and 3, which sometimes mean "interrogatory", "affirmative", "acknowledge" and "repeat", respectively, but we have deemed it unnecessary to illustrate these.

Figure 2:
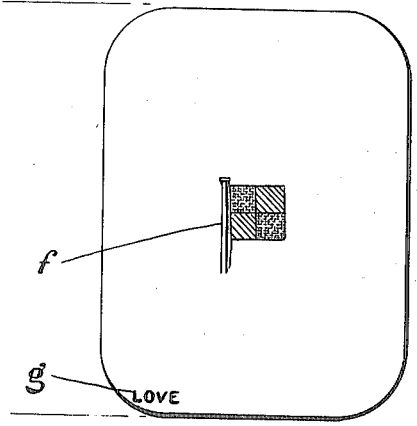
Fig. 2 is the back of the card shown in Fig. 1, bearing the key-word for the same letter and also the flag for that letter which is used in the international code of signaling.
Figure 4:
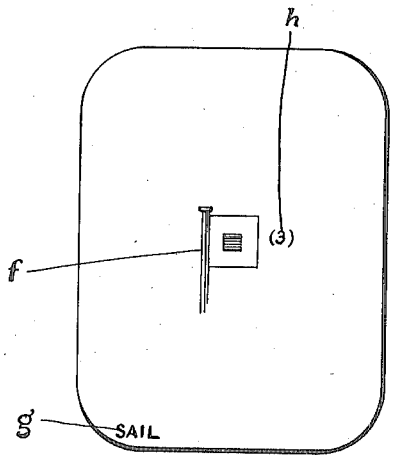
Fig. 4 shows the back of a card bearing a symbol which by the international code means both a letter and a numeral.

On the back of each of the twenty-six letter cards above described is shown, preferably in colors, the flag which by the international code indicates the same letter, and also a key-word for that letter. As shown in Figs. 2 and 4, we prefer to place the flags in the centers of the cards, as designated by reference character $f$, and the key-words in the lower left-hand corners, as designated by the reference character $g$, although it will be understood that they could be othewise arranged if desired. Such of the flags $f$ as are used to represent digits in addition to letters, by the international code, have the digit shown on the back of the card with the flag, preferably in parentheses and adjacent thereto as indicated by reference character $h$. While we could also show upon the backs of the cards the dot and dash symbols for the letters, as on the front faces, we have not done so herein, because they are the same in the international code as elsewhere.

Obviously one who is sufficiently familiar with the symbols upon the cards can tell by seeing one side what is upon the other, and this constitutes a feature of our cards and the use of them as hereinafter more fully set forth. Until one is letter perfect in all of the symbols, the fact that one side of the cards is a key to the other side enables him to put his knowledge to a practical test, as we shall explain.

In addition to the twenty-six cards described, we employ three special cards, of the type shown in Figs. 7-9 inclusive of the drawings, which have upon their faces illustrations of the semaphore symbols for "numerals", "interval" and "attention". The "numerals" card, shown in Fig. 7, has upon its back, as shown in Fig. 8, the international code flag which is used to indicate that numerals are about to be sent, said flag being marked in the drawing with the reference character $i$, and preferably placed in the center of the card like the other international code flags. Also on the back of this "numerals" card are the ten digits and the dot and dash symbols therefor which are used in the international code. The "interval" card, which we have not shown in the drawings, it being of the same type as the "attention" card next to be described, has upon its back the union jack which is used in the international code to signal for a pilot. The "attention" card has upon its back, as shown in Fig. 9, the flag designated by reference character $j$ which is used to signify that an answer is being sent by the international code. Obviously, of these three special cards the last two, "interval" and "attention", do not directly indicate by anything on either side what is upon the opposite side, and neither does the "numerals" card completely. The three cards therefore have a special significance in our game hereinafter described, and are played different from the other twenty-six cards.

The game can be played by two to five players, and to determine who shall deal each player draws a card; in doing this it should be remembered that the three special cards "numerals", "interval" and "attention" rank in the order stated and are all higher than the letter cards. The cards are dealt until each player has five cards and then the remaining cards are placed on the table face down. The object of each player is to get rid of his cards, and he first discards to the bottom of the stack on the table all cards in his hand which spell a noun. When this is done, each player in turn draws a card from the top of the pile on the table, and discards to the stack all of his cards which he can make into a noun. If he is unable to form a noun, he discards one card, anyway. Any one of the three special cards "numerals", "interval" and "attention", when in a player's hands, may be played as any letter desired, in order to form a word; for instance, if a player has C and W, and one of the three special cards, he could discard all three as spelling the word "cow".

Preferably, after playing a game with the faces of the cards, they are reversed and the game played with the backs, which affords a change both for each player as to his own cards and for each player as to the others' cards. For it will be remembered that the symbols on the backs of all but the special cards are for the same letters as the symbols on the faces of them, and thus if the player is sufficiently proficient he can tell from one side of the cards what is on the other side. This increases the interest of the game, in that it enables the players each to try to make his own words so as to prevent the others from forming words.

Having thus described the invention, what we claim is,

1. A series of playing cards having upon their faces signaling symbols for letters of the alphabet.

2. A series of playing cards having upon their faces a signaling symbol and the meanings therefor.

3. A set of playing cards comprising a series having upon their faces signaling symbols for letters of the alphabet and cards having upon their faces other signaling symbols to which an arbitrary value may be given in playing.

4. A series of playing cards having upon their faces each a semaphore signaling symbol and a dot and dash signaling symbol indicating the same thing.

5. A series of playing cards each having upon its opposite sides different signaling symbols of the same meaning.

6. A series of playing cards each having upon its opposite sides different signaling symbols each symbol accompanied by the meanings thereof.

7. A series of cards one for each letter of the alphabet and each having upon its opposite faces different signaling symbols for said letter.

8. A set of cards one for each letter of the alphabet each having upon its opposite faces different signaling symbols for said letter, and additional cards each containing upon its opposite faces other symbols of the respective systems.

9. A set of cards one for each letter of the alphabet each having upon its opposite faces different signaling symbols for said letter, and additional cards each containing upon its opposite faces other symbols of the respective systems, the symbols on the opposite faces of some of said additional cards having different meanings.

PHILIP T. HEARTT,
THEODOR SALFNER.